Oct. 15, 1957  J. RABINOW  2,810,097
OPTIMUM SENSITIVITY AUTOMATIC BIASING CIRCUIT
Filed Jan. 21, 1955

INVENTOR.
Jacob Rabinow
BY *Max L. Libman*

Attorney

United States Patent Office 2,810,097
Patented Oct. 15, 1957

2,810,097

OPTIMUM SENSITIVITY AUTOMATIC BIASING CIRCUIT

Jacob Rabinow, Takoma Park, Md.

Application January 21, 1955, Serial No. 483,192

7 Claims. (Cl. 315—83)

This invention relates to an automatic biasing circuit for electronic elements which operate at optimum sensitivity at a critical bias voltage which tends to vary under operating condition, and more particularly, to an automatic biasing circuit for a nonlinear crystal device of the above type.

Nonlinear crystal devices such as cadmium diodes, photodiodes, etc., are most sensitive when reversely biased to a point just below breakdown in the poorly conducting direction; in a critical voltage range in this region the sensitivity is very great, but even a small drift in bias voltage from the critical value causes a great decrease in sensitivity. Further, most of these nonlinear crystal devices are very sensitive to temperature and the critical bias voltage changes with even very small changes in temperature of the crystal. This is true not only of changes in ambient temperature, but is true also of very small local temperature changes caused by current flow through the crystal itself—as the temperature rises or falls, the critical bias voltage for best operation changes correspondingly. This extreme sensitivity to local temperature changes has been a severe limitation on the use of crystal devices in situations demanding extreme sensitivity.

It is a primary object of my invention to provide an automatic biasing circuit which will maintain a nonlinear crystal device at its point of optimum sensitivity regardless of internal or external temperature changes.

A further object is to provide a simple and dependable automatic biasing circuit for crystal photodiodes. Still another object is to provide an automatic biasing circuit for a device which is most sensitive at a specific noise level by maintaining the bias at the point of optimum noise level.

According to the invention, the nonlinear device is operated under conditions such that the inherent noise level can be continuously or periodically detected and the bias level on the device is controlled automatically in accordance with the detected noise level.

The specific nature of the invention, as well as other objects and advantages thereof, will clearly appear from a description of a preferred embodiment as shown in the accompanying drawing, in which.

For the purpose of illustration, the invention will be shown used in connection with an automobile headlight dimmer of the type shown in my copending application, Serial No. 388,801, filed October 28, 1953, wherein a photodiode is used to scan the field of view ahead of an automobile and automatic dimming occurs when light from the beam of an oncoming vehicle strikes the sensitive photodiode surface. The most sensitive photodiodes available have a very small photosensitive surface, usually either in the immediate area of a thin wire electrode (cat's whisker) or else at the junction of two dissimilar materials. Such diodes are available with a sensitive area in the shape of a thin line.

Figure 1:
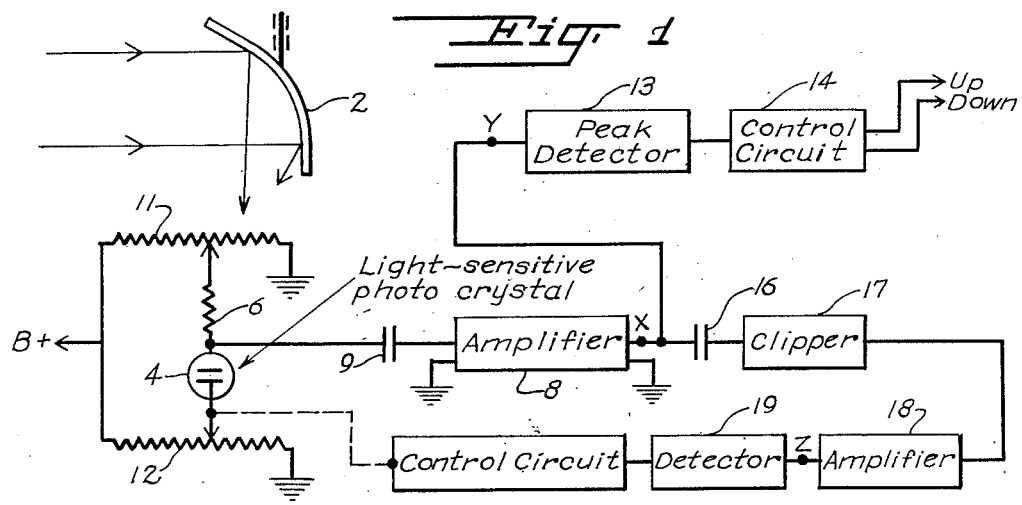
Fig. 1 is a block circuit diagram showing the principle of the invention.

Referring to Fig. 1 of the drawing, light from an oncoming vehicle strikes a curved mirror 2 which focuses this light on to the sensitive surface of the photodiode 4. One method of mounting and oscillating the mirror so as to obtain scanning of the field of view is described in my copending application Serial No. 388,801. Connected in series with a photodiode is a load resistor 6 and the amplifier 8 is connected to the connection between this resistor and the diode through a capacitor 9. The voltage across the resistor-diode combination is derived from two variable resistors 11, 12. These resistors have resistance values much lower than the value of the load resistor 6 so that the current variations caused by changes in the photodiode are negligible by comparison to the currents continuously flowing from B+ through the resistors 11, 12. When light falls on the photodiode 4 it causes a change in current through the resistor 6 thus producing potential drop which is impressed on the input of the amplifier 8 through the capacitor 9. When modulated light is used, as in the case in my headlight dimmer mentioned previously, sharp spikes of voltage are produced by the photodiode because of the scanning method employed. These voltages are impressed on the amplifier 8 as stated and the outward spikes at point X, which are much larger in amplitude, are detected by the peak detector 13 resulting in control currents in control circuit 14 that operate suitable relays to control the up and down beams of the headlights.

I have found by experiment, as have others, that the most sensitive condition of the photodiode occurs at some fixed potential across the diode where the reverse voltage just begins to break down the insulation properties of its barrier film. Or stating it another way, a germanium diode conducts current well in one direction and poorly in the other, but even in the poorly-conducting direction, as the voltage is raised, a point is finally reached when the diode begins to conduct quite readily, and it is near this point that the diode is most sensitive but at this point the current is extremely erratic of necessity, or in other words, the diode becomes noisy. This noise is impressed on the amplifier 8 along with the signal and I make use of this noise voltage across the diode to keep the diode at its most sensitive condition. To do this, the output of the amplifier 8, in addition to being impressed on the peak detector as shown and stated, is also passed through a capacitor 16 to a clipping circuit 17 which is set to clip the signals at a value just slightly higher than the average value of the noise desired. This clipping circuit is employed to eliminate the large spikes of voltage due to signals caused by the scanning system where scanning is used, as in my Patent No. 2,632,040, but the clipping circuit does not materially affect the noise. The total signal with the large signal spikes clipped is amplified again in amplifier 18 and is rectified or detected by detector 19 which produces a direct current whose amplitude is substantially proportional to the average value of the noise. This direct current can be made to pass through a control circuit and vary the position of the sliding arm of variable resistor 12. It will be obvious that moving this arm changes the potential across the combination of the diode and its load resistor. If the control circuit is properly adjusted it will be seen that if the diode starts with too low a voltage on it there will be no noise and incidentally very little signal due to light variations on the diode. The output of the detector 19 will be low and the control circuit can be so arranged that it will adjust the resistor 12 so as to raise the voltage across the diode. As the voltage across the diode is raised, a point will be reached where an appreciable noise will develop. This noise will produce an output voltage on detector 19 which will reverse the operation of the control circuits and will stop the motion of the potentiometer arm. If the time constants of the circuits are correctly arranged with sufficient damping, the value of the voltage impressed across the diode will now be correct for maximum sensitivity.

Figure 2:
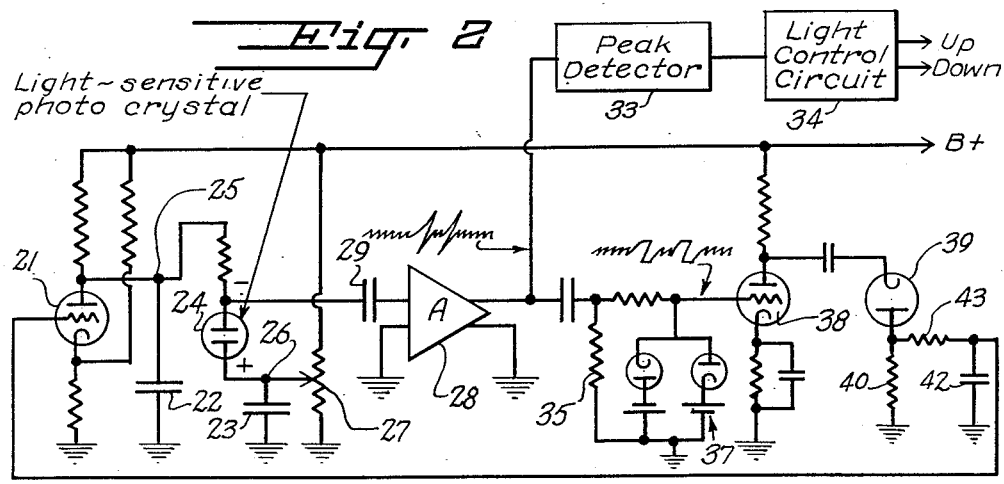
Fig. 2 is a schematic circuit diagram of a preferred form of the invention.

The actual circuit that I have employed for accomplishing this is shown in Fig. 2. Here the resistor 12 is replaced by the plate circuit of a vacuum tube 21 so that automatic control of voltage at the plate of this tube can be obtained by varying the biases impressed on its grid. Capacitors 22, 23 are put across the diode and its load resistor combination so as to keep the alternating current potentials at points 25, 26 essentially at ground level. These two capacitors also tend to filter out any noise or transients that may exist on the B+ line. A variable potentiometer 27 is impressed to set the average level of the voltage impressed on the diode so as to bring the automatic control within the range of the vacuum tube 21. The amplifier 28 is a conventional alternating current amplifier and therefore no circuit for it need be shown. The peak detector and light control circuit can be of known design and I show an example of such circuits in my Patent No. 2,632,040. Other equivalent circuits, of course, may be employed. The clipping circuit 37 consists of two diodes with their biasing batteries which follow a resistor 35 after the output of the amplifier 28. The output of the clipper is impressed on the current of vacuum tube 38 which is again a conventional amplifier that feeds the second detector composed of a diode 39 and its load resistor 4. The time constant is controlled by the capacitor 42 and the resistor 43 and these are set to be short relative to the period of scan. If this time constant were made too long the voltage output of this detector would usually be equal to that controlled by the clipping levels, so that if any one spike were big enough to be clipped at all, the time constant will be long enough then to "remember" this voltage and over-control the diode supply tube. By making the time constant short, little weight is given to the voltage produced by the clipped signals and a relatively greater weight is produced by the voltage given to the noise. It should be recognized that this technique is possible only because the time difference between the signal and the noise is such that the signal is present for a small part of the total time. If the signal were present all the time, as would be the case in an audio circuit, this technique would not be satisfactory because this simple device would not have any way of knowing whether it is responding to signals or to noise. In many cases, because the spikes of signal last for only a very short time, they can be clipped and passed into the control circuits together with the noise without seriously affecting the overall voltage. The output of the second detector 39 is filtered by the resistor-capacitor combination 42, 43 which has a long time constant relative to the signal and noise involved. For all practical purposes, one could say the output is slowly varying direct voltage. This voltage is impressed on the grid of the control tube in such a direction as to maintain the bias across the photodiode at the correct level. To show that this is so, assume for example, that the plate of the triode is at a high positive potential. The voltage across the diode for proper operation should be of the polarity shown by the plus and minus shown next to the diode 24. Assume now that the potential at the plate of the control tube 21 suddenly becomes higher than it should for proper operation. This means that the voltage across the diode is too low since the positive end of the diode is at a fixed potential controlled by the potentiometer 27. There will be no noise coming out of the diode. Under the presence of very weak light there will also be no signal. The output of the amplifier A will be low; there will be no clipping, of course; the output of the second amplifier will be low; the output of the second detector 39 will be near zero; and the grid voltage on the control tube will also be low. This will increase the current through the control tube, lowering the potential of the plate thus increasing the voltage across the diode and its load until the noise appears and the action is reversed.

Figure 3:
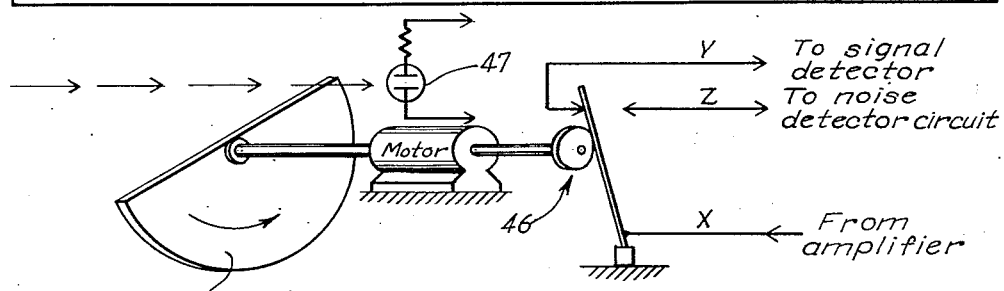
Fig. 3 is a schematic detail of a modification.

The oscilloscope pattern of the signal is shown directly above the amplifier 28 in the diagram, while the same signal after being clipped is shown above the clipping diode circuit 37, also in the same figure. It shall be seen that by means of the above regulating circuit the voltage across the diode-load combination can be regulated over a wide range so that temperature changes, aging, etc., can be compensated for and the diode kept at the optimum operating condition without attention on the part of the user of the device. As previously stated, this simple technique is directly applicable where the signal is not continuous and the noise is present for a sufficiently long time so that its amplitude can be detected, as shown. If, however, this technique is to be applied to a case where the signal is present at all times, but does not have to be detected constantly, another variant of this technique is possible. Suppose, for example, it is desired to detect light which has inherent modulation in it, such as that produced by 60 cycle current light source and suppose, in addition, that it is now necessary to observe this light at all times. A light gating means can then be provided as shown in Fig. 3 consisting of a revolving sector 45 with a portion of it removed so that light may be seen half the time, for example. A commutator 46 may be provided on the same shaft with this sector which provides a single pole double throw switch as shown in Fig. 3, so that when the light is being viewed, the output of the amplifier is passed on to the light responsive or signal circuits. While the light is shut off by the opaque section of the disc and only the noise of the photodiode 47 is present at the input of the amplifier, the noise signal is passed to the noise detector circuit and the control circuit for the photodiode. In this way the photodiode can be kept in its maximum sensitivity and the presence of a continuous signal can be determined independently. It should be understood that in the latter case the clipper circuit is no longer necessary since the signal was already eliminated by the revolving sector and that instead of using a peak detector for the signal detection, other signal detecting means may be employed.

While the system is shown in connection with a photodiode, it will be apparent that the system will be of use with any signal modifying nonlinear device having the characteristic of being both sensitive in the region of increasing noise level. For example, the system could be used with any amplifier wherein it is desired to maintain the operating point at some level of noise corresponding to a critical condition. It is necessary, however, that the signal be of such a nature as not to completely overshadow the noise.

It will be apparent that the embodiments shown are only exemplary and that various modifications can be made in construction and arrangement within the scope of my invention as defined in the appended claims.

I claim:

1. A voltage biased nonlinear signal transmitting electronic element having optimum sensitivity at a certain bias level and having a noise output which increases as said bias level is approached, means for impressing a bias voltage on said element, means for separating the noise component of current in said element from the signal component, and means responsive to the level of said noise component for adjusting the bias level in accordance with said noise level.

2. A signal responsive system comprising a voltage biased signal responsive nonlinear electronic element having optimum signal sensitivity at a certain bias level, said bias level being characterized by a definite value of increasing noise output level as said bias level is approached, means for impressing a bias voltage on said element, means for separating the noise component of output of said element from the signal component, and means responsive to the level of said noise component for adjusting said bias level in a direction to maintain said noise level at said definite value.

3. A signal responsive system comprising a voltage biased signal responsive nonlinear electronic element having optimum signal sensitivity at a certain bias level, said bias level being characterized by a definite value of noise output level, means for impressing a bias voltage on said element, means for separating the noise component of output of said element from the signal component, and means responsive to the level of said noise component for adjusting said bias level in a direction to maintain said noise level at said definite value, said nonlinear element being a photosensitive element, said separating means comprising means for periodically interrupting the access of light to said element and for gating the output of said noise component to said noise component responsive means during said interruption.

4. An automatic headlight dimmer for a vehicle comprising a photosensitive element having optimum signal sensitivity at a certain bias level characterized by a definite value of noise output level, means for impressing a bias voltage on said photo-sensitive element, means for directing light from a field of view ahead of the vehicle toward said element, circuit means to produce a signal output from said element in accordance with illumination conditions in said field of view, the total output of said element including said signals and the noise produced in said element at its bias voltage level, means for amplifying said output, circuit means responsive to said amplified output for dimming the headlights of a vehicle at a predetermined signal level, separate circuit means for substantially eliminating the effect of said signals from said output, means for detecting the resulting output to produce a voltage output in accordance with the integrated value thereof, and amplifier means controlled by said last voltage output for adjusting said bias level in a direction to maintain said integrated value at a definite level.

5. An automatic headlight dimming system comprising means for directing light from a field of view, toward a photosensitive element having optimum signal sensitivity at a certain bias level characterized by a definite value of noise output level, means for impressing a bias voltage on said photosensitive element, the sensitive area of said photosensitive element being much smaller than the area of said image, means for producing rapid periodic scanning motion between said photosensitive element and said image whereby bright spots on said image produce a periodic spiked signal output from said element, the total output of said element including said signal output and noise produced in said element, means for amplifying said output, circuit means responsive to the peak level of said amplified output for dimming the headlights of a vehicle at a predetermined signal level, separate circuit means for clipping said total output to eliminate said spiked signals, means for detecting the clipped output to produce a voltage output in accordance with the integrated value of said clipped signals, and amplifier means controlled by said last voltage output for adjusting said bias level in a direction to maintain said integrated value at a definite level.

6. An automatic headlight dimmer for a vehicle comprising means for producing an image of a field of view ahead of a vehicle, a nonlinear photodiode having two terminals reversely biased to the point of maximum sensitivity, said photodiode having the characteristic of maximum inherent noise output near the point of maximum sensitivity, means for producing relative motion between said image and the sensitive areas of said photodiode so that said area scans said image, means for biasing said photodiode with a reverse voltage to a point of optimum sensitivity, circuit means connected to one terminal of said photodiode responsive to output voltage changed produced by bright spots in said image for actuating a headlight dimming circuit on the vehicle, a further circuit connected to said photodiode to produce said signals and also containing the inherent noise output of the photodiode, means for limiting the voltage in said further circuit to a level slightly higher than a maximum predetermined noise level, means for rectifying and detecting the remaining signal in said further circuit after limiting to produce a bias control signal, and voltage regulating means controlled by said bias control signal to adjust the bias on said photodiode to maintain said noise level at a predetermined value.

7. An automatic headlight dimmer for a vehicle comprising means for producing an image of a field of view ahead of a vehicle, a nonlinear photodiode having two terminals reversely biased to the point of maximum sensitivity, said photodiode having the characteristic of maximum inherent noise output near the point of maximum sensitivity, means for producing relative motion between said image and the sensitive area of said photodiode so that said area scans said image, means for biasing said photodiode with a reverse voltage to a point of optimum sensitivity, circuit means connected to one terminal of said photodiode responsive to output voltage changes produced by bright spots in said image for actuating a headlight dimming circuit on the vehicle, a further biasing circuit connected to the output circuit of the photodiode, means for clipping the voltage in said further circuit to a value above the maximum permissible noise level to minimize the signals produced by bright spots in the field of view, means for rectifying and detecting the remaining signal in said further circuit, a regulating tube having its plate circuit connected to the second terminal of said photodiode, means for filtering said detected remaining signal and means for applying said filtered signal to a control grid of said regulator tube to adjust the plate voltage and hence the total bias across the photodiode in accordance with the rectified noise level.

References Cited in the file of this patent
UNITED STATES PATENTS

| | | |
|---|---|---|
| 2,299,398 | Kreuzer | Oct. 20, 1942 |
| 2,469,852 | Strutt et al. | May 10, 1949 |